(12) United States Patent  (10) Patent No.: US 8,775,174 B2
Conejero et al.  (45) Date of Patent: Jul. 8, 2014

(54) METHOD FOR INDEXING MULTIMEDIA INFORMATION (75) Inventors: David Conejero, Madrid (ES); Helenca Duxans, Madrid (ES); Gregorio Escalada, Madrid (ES)

(73) Assignee: Telefonica, S.A., Madrid (ES)

( * ) Notice: Subject to any disclaimer, the term of this patent is extended or adjusted under 35 U.S.C. 154(b) by 395 days.

(21) Appl. No.: 13/095,388

(22) Filed: Apr. 27, 2011

(65) Prior Publication Data

US 2011/0320197 A1    Dec. 29, 2011

Related U.S. Application Data

(60) Provisional application No. 61/357,789, filed on Jun. 23, 2010.

(51) Int. Cl.
*G10L 15/26*    (2006.01)
(52) U.S. Cl.
USPC .......................... 704/235; 704/255; 704/257

(58) Field of Classification Search
USPC ......... 704/231, 235, 245, 250, 270, 244, 239, 704/240, 257, 255, 1–10, 251
See application file for complete search history.

(56) References Cited

U.S. PATENT DOCUMENTS

| | | | | |
|---|---|---|---|---|
| 6,263,308 | B1* | 7/2001 | Heckerman et al. | 704/231 |
| 6,332,122 | B1* | 12/2001 | Ortega et al. | 704/270 |
| 6,618,702 | B1* | 9/2003 | Kohler et al. | 704/250 |
| 6,748,356 | B1* | 6/2004 | Beigi et al. | 704/245 |
| 7,912,714 | B2* | 3/2011 | Kummamuru et al. | 704/245 |
| 2007/0118373 | A1* | 5/2007 | Wise et al. | 704/235 |

* cited by examiner

*Primary Examiner* — Huyen X. Vo
(74) *Attorney, Agent, or Firm* — Sughrue Mion, PLLC

(57) ABSTRACT

It comprises analyzing audio content of multimedia files and performing a speech to text transcription thereof automatically by means of an ASR process, and selecting acoustic and language models adapted for the ASR process at least before the latter processes the multimedia file, i.e. "a priori".

The method is particularly applicable to the automatic indexing, aggregation and clustering of news from different sources and from different types of files, including text, audio and audiovisual documents without any manual annotation.

19 Claims, 5 Drawing Sheets

```
For each new Event, if( time_from_previous_event < threshold) then do not change else change models accordingly endif end
```

FIG. 5

METHOD FOR INDEXING MULTIMEDIA INFORMATION

FIELD OF THE ART

The present invention generally relates to a method for indexing multimedia information, including a speech to text transcription of audio information, and more particularly to a method where the speech to text transcription is performed automatically by means of an ASR process, and which comprises a priori selection of acoustic and language models.

The method is particularly applicable to the indexing, aggregation and clustering of news from different sources and from different types of files, including text, audio and audio-visual documents without any manual annotation.

PRIOR STATE OF THE ART

Nowadays, the access to digital news is easy and fast, only an internet connection is needed. Through the network users can visit their preferred news feeds, i.e. a radio station, a TV channel, a digital newspaper or a personal web site, and browse through the broadcasted contents. However, this is a browsing centered on the news feed, not in the news themselves. The access to all the pieces of news related to the same event broadcasted by different feeds and in different media at the same time is still a challenge, especially for those based on non-textual media.

To the knowledge of the inventors, nowadays the following indexation and aggregation systems exist:
  Textual indexation: NewsExplorer [1], Google News Cloud [2] or CyberAlert [3],
  Textual aggregation: NewsExplorer [1] or Google News Cloud [2].
  Audio indexation: Gaudi (Google Audio Indexing), Dali [9], or Blinkx [10]

Previous studies that have become news aggregation applications open to the internet community are NewsExplorer, Google News Cloud or CyberAlert, for example. However, these applications only deal with textual data, without aggregating any information broadcasted in audiovisual format and if they include a conceptual relationship between news they are done manually. On the contrary, applications like Gaudi, Dali, or Blinkx are focused on indexing video content, but they do not deal with text and only-audio contents and the news aggregation is simple or inexistent. Moreover, videos are not treated as a whole but the news have been manually selected previous to its transcription.

To sum up:
1. Index and aggregate of news are performed and provided separately for different media.
2. Video and audio news programs must be manually segmented into individual news pieces in order to be aggregated independently.
3. The conceptual relationship between news is manually labelled.

Figure 3:
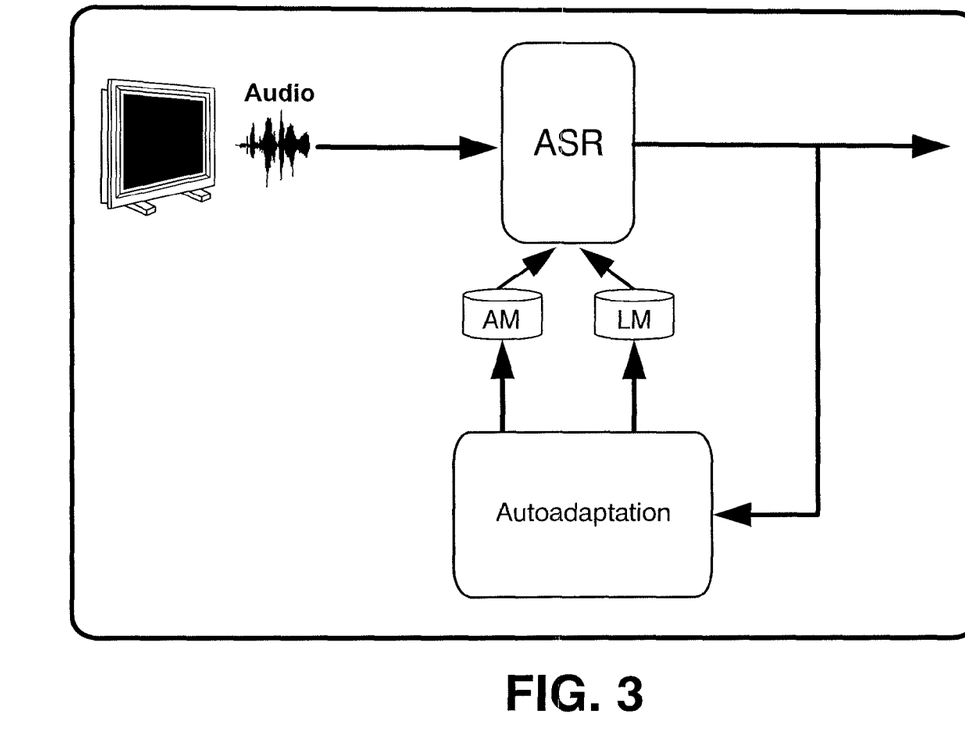
FIG. 3 illustrates a classical ASR system using autoadaptative AM and LM.

In order to transcript audio from audio or audiovisual files, automatic transcription systems are used to follow the scheme depicted in FIG. 3. An automatic speech recognition (ASR) is performed using autoadaptative acoustic and language models (AM and LM). There are several autoadaptation systems on the market, but most of them do their adaptation reacting to the incoming entrance. The acoustic and language model adapt to the content based on the recognitions done previously, i.e. they perform "a posteriori" adaptation, which result in drawbacks regarding the processing time and resources needed before the appropriate models have been generated for the ASR.

Regarding said AM and LM models, Dali [9] states that during processing, increasingly detailed models are used at each step, while Blinkx [10] uses audio analysis techniques that are based on neural network technology and Hidden Markov Models (HMMs) to construct an efficient acoustic model that can provide a fast, accurate and dynamic solution within rapidly changing acoustic environments, such as radio and television, and LM with predictive technology.

DESCRIPTION OF THE INVENTION

It is necessary to offer an alternative to the state of the art which covers the gaps found therein, particularly those existing in the known indexing methods which analyze audio content of multimedia files.

To that end, the present invention provides a method for indexing multimedia information, comprising analyzing audio content of multimedia files and performing a speech to text transcription thereof where, on contrary to the known proposals, and in a characteristic manner, said speech to text transcription is performed automatically, for each multimedia file, by means of an ASR process. The method of the invention also comprises selecting acoustic and language models adapted for said ASR process at least before the latter processes the multimedia file, i.e. "a priori".

The method of the invention is applied, for an embodiment, to multimedia information which also comprises text files, the method comprising automatically aggregating information from said text files to information from said multimedia files with audio content.

The method further comprises, for some embodiments, automatically clustering said multimedia information.

For a preferred embodiment, said multimedia information refers to news, the method comprising indexing said news from different sources, and preferably aggregating and clustering it.

Other embodiments of the method of the invention are described in a subsequent section related to the detailed description of several embodiments.

BRIEF DESCRIPTION OF THE DRAWINGS

The previous and other advantages and features will be more fully understood from the following detailed description of embodiments, with reference to the attached drawings (some of which have already been described in the Prior State of the Art section), which must be considered in an illustrative and non-limiting manner, in which.

DETAILED DESCRIPTION OF SEVERAL EMBODIMENTS

The proposed invention is, for the embodiments described in this section, a method in the form of an application to index, aggregate and cluster news from different multimedia feeds: digital newspapers, online news channels, personal blogs or videoblogs, etc. The present inventors understand that:

Indexation: consists in the registration of all the relevant concepts or keywords that appears in the news content together with their positions (time for audiovisual data). The recognition confidence for transcribed words is also registered.

Aggregation: Joining different news from different media containing the indexed concept.

Cluster: Joining the more similar keywords in order to make relations among news.

There are three main application novelties in the invention:
1. The aggregation is performed on different media news, improving the indexing performance by jointly using different media (specifically text and audio)
2. Complete news programs/articles are automatically incorporated to the aggregation, by automatically segmenting them in order to provide the aggregation system a set of individual pieces of news.
3. Link news containing different concepts The method of the invention is based on an iterative process to get an accurate transcription of the audio content, and a posterior textual analysis in order to aggregate and cluster similar news from different sources. The final result from the process would be an unified description of the multimedia file. This description will facilitate the indexing, classification, search and aggregation of the multimedia content.

The main objectives of the invention are:
1. To improve the textual description of the audiovisual news by incorporating textual information in the ASR process.
2. To segment complete news programs/articles in individual news to be aggregated by the system.
3. To provide an aggregation of news of different media.
4. To cluster conceptually similar news.

Figure 1:
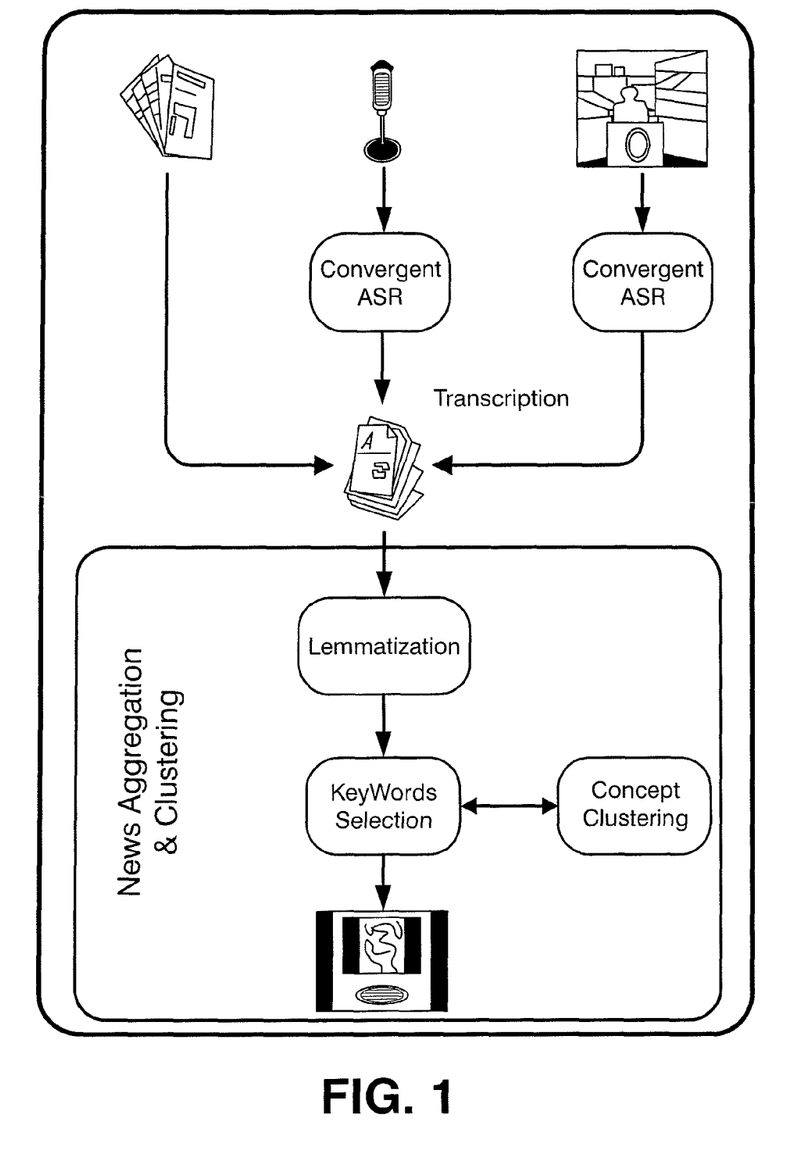
FIG. 1 shows a back end system used to implement the method of the invention, where those parts drawn with a darker colour are innovative modules and workflows.

The Indexing and Aggregation of news is an innovative application to automatically cluster news from different mass media (TV, Radio, Newspapers). In order to do so, the news aggregation provided by the proposed invention is based on the information stored in xml files that have been automatically generated by the back-end system. The back-end system is depicted in FIG. 1. On the figure, darker color is for innovative workflows and modules.

To index and cluster the multimedia feeds every new multimedia document is treated according to the media available: text, audio or both. The back-end system transcribes the audio track into text by an ASR (Automatic Speech Recognition). Then transcription and text data from the newspapers are lemmatized. The indexation consists of detecting all the relevant concepts in the multimedia material and in keeping track of the place (for textual documents) or instant (for audiovisual documents) of their appearances. The clustering consists in selecting the keywords among all the relevant indexed concepts to generate a news label with the relationship between all the documents that contains the same keyword. Finally, for each concept the nearest keywords are selected.

By the moment, any visual cues, as from the video track as well as from images inserted in digital newspapers, are not used. However, the architecture of the indexing system has been designed to be easily extendable.

The technological innovations included on the invention are:
Convergent ASR module:
  Textual diarization
  "A priori" selection of acoustic and language models for ASR (Model Selection)
  Aggregation of subtitles and ASR transcription (Aggregator)
  Iterative ASR to include more information on each instance (Iteration)
KeyWords Selection
Concept clustering module:

More detailed information about each module is provided in the following sections.

Figure 2:
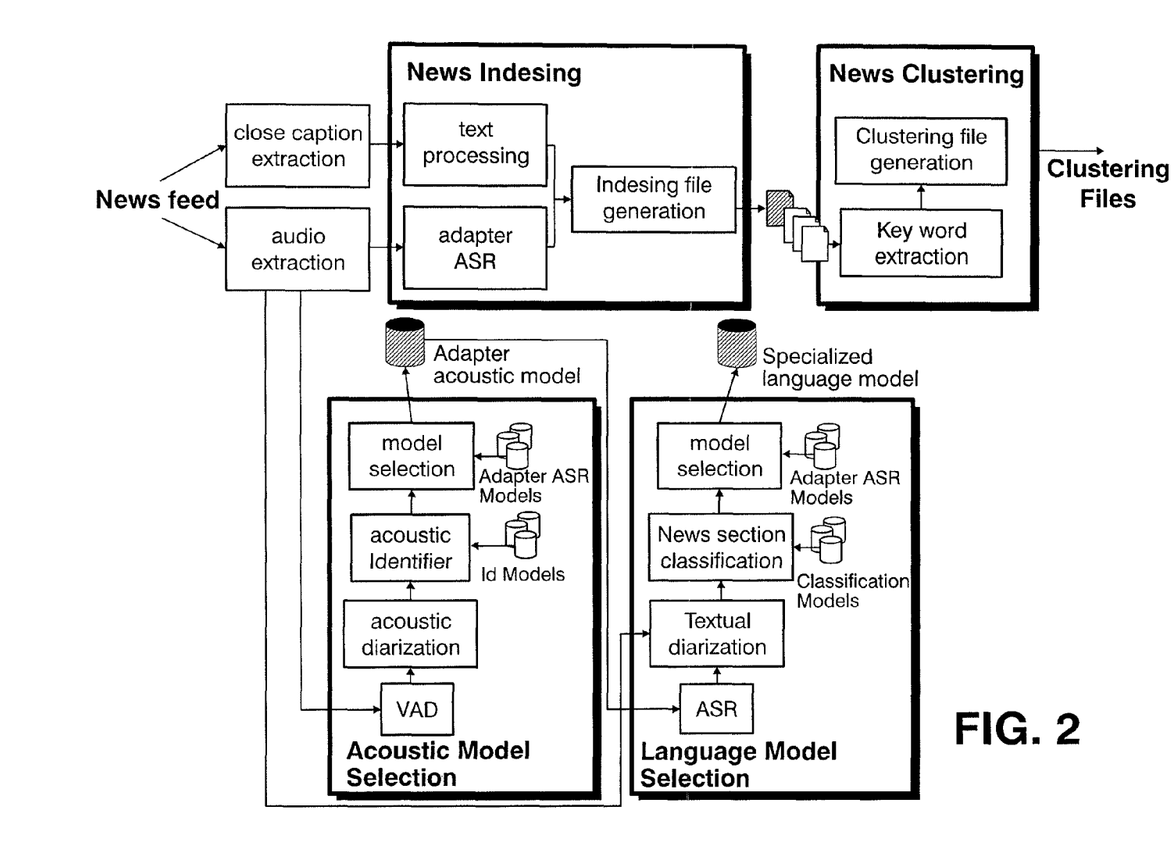
FIG. 2 shows a block diagram of part of the back-end system of FIG. 1, for a News feed, showing in detail the AM and LM selection modules for an ASR, included in what in FIG. 1 is denominated as "Convergent ASR".

A block diagram of the back-end system is shown in FIG. 2.

Convergent ASR:

Automatic transcription systems are used to follow the scheme depicted in FIG. 3. An automatic speech recognition (ASR) is performed using autoadaptative acoustic and language models (AM and LM). There are several autoadaptation systems on the market, but most of them do their adaptation reacting to the incoming entrance. The acoustic and language model adapt to the content based on the recognitions done previously.

The Convergent ASR of the method of the present invention deals with the information in a completely different way. Instead of adapting the models to the content, the system selects the more appropriate models to make the recognition. Instead of "a posteriori" adaptation, "a priori" selection is done.

Speaker Diarization:

The goal of the Speaker Diarization module (see FIGS. 2 and 4) is to continuously provide the most adequate ASR acoustic model to perform the automatic transcription of the audio content. This module consists in three main operations: the segmentation of the audio track, the identification of the acoustic characteristics of each segment and the selection of the most adequate ASR acoustic model from an available set.

Figure 4:
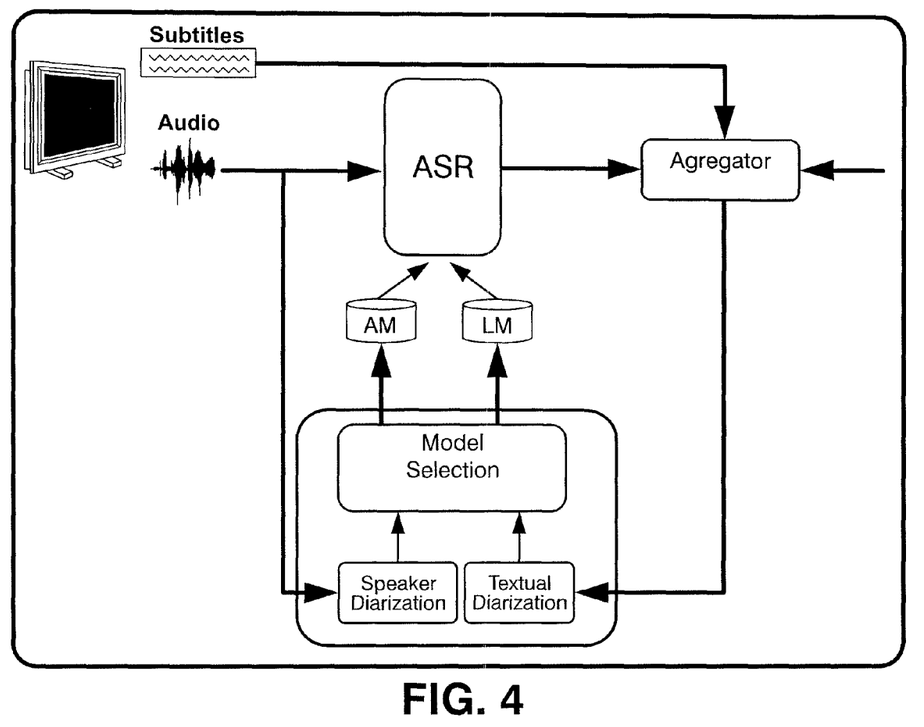
FIG. 4 is a block diagram illustrating a system implementing the method of the invention, for an embodiment, where the LM selection is done also from textual information aggregated to the text transcription performed by the ASR process in a previous cycle.

The segmentation of the audio track into similar acoustic intervals is performed by removing the non-speech parts using a VAD (Voice Activity Detection) and applying a diarization technique based on BIC (Bayesian information criterion) [5]. Then, each cluster is processed by an open set acoustic identifier using LLR (log-likelihood ratio) as a decision score [7]. When an identification is positive, the corresponding adapted ASR acoustic model is selected. If the identification is "Unknown" a general ASR acoustic model for multimedia applications is selected.

The models for acoustic identification and for the adapted ASR have been estimated in the development phase of the back-end system for: general multimedia applications, news conductors and noisy environments typical of news programs (background music, outdoor connections . . . ). All the acoustic models are HMM of cepstrum features adapted using the MLLR+MAP technique [8].

Textual Diarization:

Provided a textual representation of the audiovisual document (coming either from the subtitles alone, or from a previous running of the transcription module), a textual diarization (see FIGS. 2 and 4) and subject identification is made, in order to select a better Language Model to transcribe the audio.

This module is a novelty, as usually document classification tasks treat the document as a whole, and provide a single class representative for the document. As (some of) the documents of this application are in fact news aggregation (radio and TV news programs), a finer classification is needed.

The input of the module is the text transcription of the document:
 a) Close-caption of the TV program, if available
 b) Output of a previous transcription cycle, with the subtitles info aggregated, if available
 c) Text of the news, if the document is a newspaper page.

In c), the document already represents only one piece of information, so no diarization is needed, and textual classification runs in the state of the art procedure.

In both a) and b), textual representation includes temporal information, representing (approximately) when the transcribed speech was uttered in the document. Transcription is provided in pseudo-sentences (either speech between pauses of a minimal duration, or lines in the close-caption system). In this case, the module has to provide a splitting of the document in temporal chunks, and the subject classification for each of these chunks. All the procedure is independent of the taxonomy of the classes to be recognized. The class universe is only defined by the tags and models previously trained in the system. It can be the classical news sections ("national", "international", "sports" . . . ) or a more complex system (like IPTC taxonomy [13]), or even single news identifiers. Only two special classes are defined: "welcome" and "farewell".

The procedure sequence to obtain each chunk with its classification is the following:
  For each piece of information ("pseudo-sentences"), a context aggregation is performed, as usually a single phrase does not provide enough information for the classification task. This aggregation is made with a temporal criterion (an application parameter (20 seconds have been found the better for the invention) before and after the sentence to be classified), so if there is a long break, chances are less to get into a different piece of information.
  Standard classification strategy (Bow toolkit for statistical language modeling [6], Naive Bayes, with Laplace smoothing) is applied to every contextual aggregated sentence.

After the classification, all class hypotheses with their scores are kept.
  A time-weighted rank ordering filter is applied to select the best hypothesis for the "sentence" to be classified. The rank order filter aggregates the scores for each class in a time window, using a triangular shape windowing function, and selects the class with the highest value.
  Finally, a postprocessing is run in order to avoid class sequences too shorts, if they lay between two long sequences with the same class. Only "welcome" and "farewell" are allowed be elude this condition.

Model Selection:
Once the file has been acoustically and textually diarized, it is necessary to select the models to perform the best recognition possible on each part of the file.

In order to select the most appropriate acoustic model (see FIGS. 2 and 4), every Acoustic Event (speaker change) or Textual Event (topic change) are considered as independent Events. And it is considered that the beginning of the file, Acoustic and Language Models are General Ones.

Figure 5:
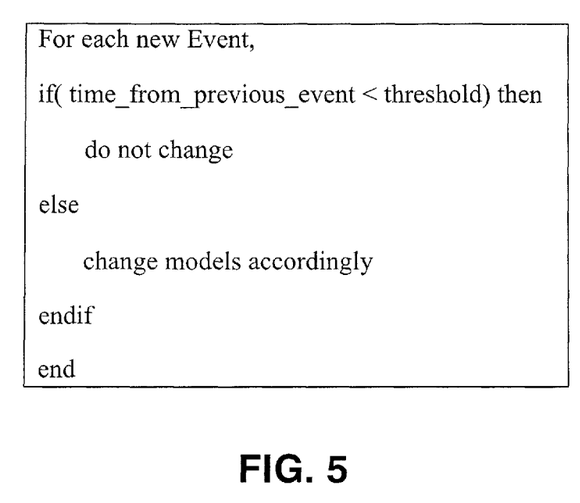
FIG. 5 shows a model selection algorithm for an embodiment of the method of the invention.

Then all Events (Acoustic and Textual indistinctively) are temporally sorted out, and algorithm depicted in FIG. 5 is implemented.

It is also necessary to consider that not all acoustic or language models are available, so they should be changed to the nearest acoustic/topic model available.

Aggregator:
For some documents (TV news), there is close-captioned information available. These subtitles are usually available for the conductors and for the edited news, but not for the live connections. These subtitles, even though they are not literal transcription of the uttered words, and can have typos and misspellings, are usually much more correct than the straight output of the ASR.

For this reason a new module (aggregator in FIG. 4) has been developed, whose function is to join the subtitles (if available) and the ASR output for the blanks in the close-captioned information. This task is not as straightforward as could seem to be. Subtitles are not exactly aligned with the spoken speech, so some heuristics have to be implemented in order to obtain the best aggregation of information:
  First, subtitles time information is converted to the same units (seconds) of the ASR output, as this information comes originally in frames per second.
  "Blanks" in the subtitles are detected. This "blanks" are defined as time spans longer than a threshold application dependent (15 seconds; shorter "blanks" can come from the music lead, and can be sometimes incorrectly interpreted as voice and transcribed by the ASR).
  For every "blank", it is filled with the output of the ASR. But time information is not enough to select the right transcribed sentences to fill the gap. The most frequent situation is that subtitles are delayed with respect to the speech (up to 5 seconds). To take this case into account, the different sentences in the ASR output, candidates to begin the filling, are evaluated against the last piece of information in subtitles before the "blank" (let's call this line "reference sentence"). These candidates are those sentences whose begin time are between five seconds before and two seconds after the end time of the "reference sentence". The measure is the number of non-stopwords in common between the candidate and the reference sentence. The candidate with the maximum number of matches is selected as the alignment point, and the filling starts with the next sentence candidate. This is the main innovation in order to make this innovative module work properly.
  For the end of the blank, a similar procedure is followed, modifying the overlapping thresholds, as usually the subtitles begin are better aligned to the speech (so one second before, and three seconds after).
  Finally, time stamps are corrected, in order to keep temporal information as coherent as possible. For subtitles beginning and end times are kept. For the ASR output filled in the blank, ASR time information is also kept. The only modifications made are in border areas, in order to avoid temporal overlapping of the sources. In these cases overlapping area is split between the subtitle reference sentence and the first (or last) ASR transcription sentence.

Iteration:
In order to improve the performance of the overall system, the process can be iterated. The "new" transcription can be diarized, and used to repeat the transcription process with more accurate information.

Depending on the initial information available, the process could be as follows:
If there are subtitles: The subtitles are diarized, and the file is recognized, on places where no subtitles are found a general language model will be used. The new transcription is appropriately added to the original subtitles, filling the gaps, and a new diarization is made. A new transcription is done, but in this case, most of the file will be transcribed with appropriate language models.

If there are not subtitles: The file is recognized using general language models. The new transcription is textually diarized and used to make a new, more accurate transcription using a selection of language models based on the new diarized transcription.

News Aggregation & Clustering:

Once the transcriptions have been done by the convergent ASRs, as shown in FIG. 1 every multimedia news document ingested in the system is automatically indexed and an xml file for each document is generated.

The indexation carried on consists in the registration of all the relevant words that appears in the news text together with their positions (time for audiovisual data). The recognition confidence for transcribed words is also registered.

The last module of the back-end system extracts the most relevant keywords of all the material that has been ingested to the system and generates an xml clustering file.

The clustering file is generated from the list of selected keywords by searching each keyword on the indexing files and contains for each keyword the number of occurrences on the database, the list of the documents where the keyword appears, and the list of related keywords. For each one of the documents, it is specified the kind of media: video, audio or text. Each video and audio file has associated the list of segments (in seconds) when the word has been said. Each segment also contains information on the ASR confidence measure and its thumbnail file. The information associated to text files includes the link to the news and its thumbnail.

KeyWords Selection:

To select the most relevant keywords, text is lemmatized [14], and then a modified TFIDF [12] algorithm is applied to select a set of lemmatized words extracted from all the indexing files.

The standard tfidf formula states:

$$tfidf(i, j) = \frac{n_{i,j}}{\sum_k n_{k,j}} \times \log \frac{|D|}{|\{d:t_i \in d\}|}$$

Where:
  $n_{i,j}$ is the number of occurrences of the considered term ($t_i$) in document $d_j$, and the denominator on the first division is the sum of number of occurrences of all terms in document $d_j$.
  |D|: total number of documents in the corpus
  |{d:t_i∈d}|: number of documents where the term $t_i$ appears (that is $n_{i,j}\neq 0$).
  This formula represents how relevant a word i is in a document j.

It can also been used to identify the most relevant words in a set of documents, summing up the tfidf(ij) for all the documents.

$$tfidf(i) = \sum_j tfidf(i, j)$$

This formula can be improved, using as much information from the document and its structure as possible:
  Words present in the headline or abstracts (if available, like in newspapers) are boosted with respect to the body words. They are weighted with a factor greater than one (factor $W_{head}$=1.2 in the invention).
  Another factor ($W_{POS}$) is included in the equation. This weight depends on Part-of-Speech (POS).
  Geographical and organization proper nouns receive a greater weight (1.0) than verbs and common nouns (0.6) and adjectives (0.2). People first names receive also a low weight (0.2). Stop-words receive a 0.0 weight.

Finally, the presented application has a different goal than the standard information retrieval the formula was developed for. In this application, the interest is not focused only in the words more relevant for a single document, but for the whole set of documents. So terms present in a number of documents can be more relevant than terms present in a single document. So instead of using the logarithm of the inverse of the document frequency, a power is used, whose exponent is dependent on the POS of the word:

$$tfidf(i, j) = W_{POS} \times W_{head} \frac{n_{i,j}}{\sum_k n_{k,j}} \times \left(1 - \left(\frac{d_j}{D}\right)^{f(POS_i)}\right)$$

This dependency allows us to control the distribution of the nature of relevant words in the documents. The highest this pseudo-kurtosis weight is, the less sensible is the word to be penalized by the number of documents it appears in.
f(NPRO)=2.5, so "España" can be relevant even if it appears in almost half of the documents.
f(NOMB)=0.2, so "noticia" gets a very low score for being in lot of documents, and "secuestro" is more relevant for being in a small subset.
where NPRO stands for "Proper Noun" and NOMB stands for "Noun".

Conceptual Clustering:

For each keyword the list of related keywords is extracted. In order to do so, the following formula is applied to calculate the correlation of each pair of words X and Y:

$$C_{xy} = k_y \frac{N_{xy}}{N_x + N_y}$$

Where $N_x$ is the number of documents where word X appears, $N_{xy}$ is the number of documents where words X and Y appear. And ky is the relevance of word Y as calculated at TFIDF algorithm.

Let be T the minimal number of selected keywords on the list, then $C_{xT}$ is the correlation of word X with its Tth more correlated word (T). And ave($C_{xT}$) the average of the correlation values for the Tth correlated term for every word.

The list of related keywords will contain:
  All words with a correlation bigger than ave(Cxy).
  At least the Tht more correlated words.

The Conceptual Clustering is performed periodically in order to capture the news evolution in time and the appearance/disappearance of tags.

Advantages of the Invention

Next are some features of the invention:

1.—The invention provides a unique aggregation of textual, audio and audiovisual feeds.

2.—The invention extracts individual news pieces from a complete news program/article in order to aggregate each piece independently.

3.—In the indexation process, textual and acoustical information are jointly used to improve the performance.

4.—The audio transcription accuracy is improved by an iterative process that selects a priori trained acoustic and language models using both textual and audio information.

5.—Other interesting information (speakers, environments, . . . ) is captured on the process that may be used to gather new information.

6.—The modularity of the system allows to incorporate new indexing modules based on different techniques that improve the overall system.

A person skilled in the art could introduce changes and modifications in the embodiments described without departing from the scope of the invention as it is defined in the attached claims.

Acronyms
ASR Automatic Speech Recognition
BIC Bayesian information criterion
HMM Hidden Markov Models
LLR Log-likelihood Ratio
TV Television
VAD Voice Activity Detection References
- [1] R. Steinberger, B. Pouliquen, C. Ignat Navigating multilingual news collections using automatically extracted information. Journal of Computing and Information Technology, 2005. http://emm.newsexplorer.eu/News-Explorer/home/ES/latest.html
- [2] http://fserb.com.br/newscloud
- [3] http://www.cyberalert.com/cyberalerttv.html
- [4] http://silverlight.net
- [5] S. Chen, P. Gopalakrishnan. Speaker, environment and channel change detection and clustering via the bayesian information criterion. Proceedings DARPA Broadcast News Transcription and Understanding Workshop, Virginia, USA, 1998.
- [6] A. K. McCallum Bow: A toolkit for statistical language modeling, text retrieval, classification and clustering. http://www.cs.cmu.edu/mccallum/bow, 1996.
- [7] D. A. Reynolds Comparison of background normalization methods for text-independent speaker verification in Proc. 5$^{th}$ European Conference on Speech Communication and Technology, Eurospeech 97 Sep. 1997, Greece
- [8] J.-L. Gauvain and C.-H. Lee Maximum a posteriori estimation for multivariate Gaussian mixture observations of Markov chains IEEE Trans. Speech, and Audio Processing, vol. 2, no. 2, pp. 291-298, 1994.
- [9] http://showroom.daedalus.es/es/tecnologias-de-busqueda/dali/
- [10] http://www.blinkx.com/
- [11] N. Sarris, P. Villegas, M. Pinkerneil, J. Spangenberg, J. Picault Personal navigation in the world of news 1st International conference on Semantics And digital Media Technology, SAMT2006 6-8 Oct. 2006, Athens, Greece http://www.mesh-ip.eu/
- [12] G. Salton and C. Buckley Term-weighting approaches in automatic text retrieval Information Processing & Management vol. 24, no. 5, pp. 513-523, 1988
- [13] http://www.iptc.org
- [14] http://www.loria.fr/~gardent/applicationsTAL/slides/I4-nltk-corpora-tokenization-2x2.pdf

The invention claimed is:

1. A method for indexing multimedia information, comprising analyzing audio content of multimedia files and performing a speech to text transcription thereof, wherein said speech to text transcription is performed automatically using a processor in a computer, for each multimedia file, by means of an Automatic Speech Recognition, or ASR, process, and in that the method comprises selecting acoustic and language models adapted for said ASR process at least before the latter processes the multimedia file,
wherein said selection of language models is performed by carrying out, on textual information of each multimedia file, at least a textual diarization and a subject identification,
wherein said textual information includes temporal information representing its temporal position in the multimedia file audio content, said textual diarization comprising splitting the multimedia file in temporal chunks or pseudo-sentences, and wherein a subject classification is performed for each of said chunks
the method comprising obtaining each of said pseudo-sentences with its classification by:
performing using the processor, for each pseudo-sentence, a context aggregation with a temporal criterion;
applying, using the processor, a standard classification strategy to every contextual aggregated pseudo-sentence, based on a set training categories to obtain all class hypotheses with their scores are kept;
applying, using the processor, a time-weighted rank ordering filter to select the best class hypothesis for the sentence to be classified, and
performing, using the processor, a postprocessing in order to avoid too short sequences of one class, if it lays between two long sequences with the same class, where only "welcome" and "farewell" classes, laying respectively at the beginning and end of the indexed multimedia information, are allowed to elude this condition.

2. A method as per claim 1, wherein said multimedia information also comprises text files, the method comprising automatically aggregating information from said text files to information from said multimedia files with audio content.

3. A method as per claim 2, further comprising automatically clustering said multimedia information.

4. A method as per claim 3, comprising:
lemmatizing the multimedia files text transcription and the text data of text files and
indexing said multimedia information by detecting all the relevant concepts in the multimedia and text files and keeping track of the place, for text files, or instant, for audiovisual files, of their appearances.

5. A method as per claim 4, wherein said clustering of multimedia information comprises selecting the keywords among all the relevant indexed concepts to generate a label with the relationship between all the files that contains the same keyword, and by a final selection, for each concept, of the nearest keywords.

6. A method as per claim 5, wherein said keywords selection is performed by applying a modified TFIDF algorithm to the lemmatized text to select a set of lemmatized words extracted from all the indexing files according to its relevance for a single file or for a set of files, where said modified TFID algorithm is based on:

$$tfidf(i, j) = W_{POS} \times W_{head} \frac{n_{i,j}}{\sum_k n_{k,j}} \times \left(1 - \left(\frac{d_j}{D}\right)^{f(POS_i)}\right)$$

where POS means Part-of-Speech, $W_{POS}$ is a weight factor depending on POS, $W_{head}$ is a weight factor for words present in the headline or abstracts, $n_{i,j}$ is the number of occurrences of the considered term $t_i$, in document $d_j$, $\Sigma_k n_{k,j}$ is the sum of number of occurrences of all terms in document $d_j$ and D is the number of documents.

7. A method as per claim 6, comprising performing, for each keyword, an extraction of a list of related keywords by calculating the correlation of each pair of words X and Y by means of the following formula $$C_{xy} = k_y \frac{N_{xy}}{N_x + N_y}$$

where $N_x$ is the number of files or documents where word X appears, $N_{xy}$ is the number of files or documents where words X and Y appear, and $k_y$ is the relevance of word Y as calculated by means of said modified TFIDF algorithm, said list including keywords with a correlation bigger than $C_{xy}$.

8. A method as per claim 1, wherein said multimedia files with audio content comprise at least one of audio files and audiovisual files.

9. A method as per claim 1, wherein said selection of acoustic models is performed by carrying out, on each multimedia file, at least a speaker diarization.

10. A method as per claim 9, wherein said speaker diarization is carried out by performing three main operations:
   a segmentation of the audio track related to said multimedia file audio content into similar acoustic segments;
   an identification of the acoustic characteristics of each segment, or cluster of segments, obtained from said segmentation; and
   a selection of the most adequate ASR acoustic model from an available set.

11. A method as per claim 10, wherein said segmentation is performed by removing the non-speech parts using a Voice Activity Detection and applying a diarization technique based on a Bayesian information criterion for clustering related segments.

12. A method as per claim 11, wherein said identification of acoustic characteristics is carried out by processing each cluster obtained from said clustering by an open set acoustic identifier using LLR, log-likelihood ratio, as a decision score, said identification given as a result one of a positive identification and an unknown identification.

13. A method as per claim 12, wherein said selection of the most adequate ASR acoustic model comprises:
   for said positive identification, selecting a corresponding adapted ASR acoustic model associated to said acoustic characteristics, or
   for said unknown identification, selecting a general ASR acoustic model for multimedia applications.

14. A method as per claim 1, wherein said textual information comes from subtitles and/or closed caption contained in the multimedia file and/or from a previous transcription thereof.

15. A method as per claim 1, comprising, once the multimedia file has been acoustically and textually diarized, selecting the acoustic and language models to perform the best recognition possible on each part of the multimedia file considering every acoustic event and every textual event as independent events, and considering that the beginning of the multimedia file is assigned to acoustic and language general models.

16. A method as per claim 15, comprising, for each new event of said independent events, if it happens after a previous event a time over a determined threshold, changing models accordingly as a result of new diarizations.

17. A method as per claim 1, comprising aggregating standard or close-caption subtitle textual information of a multimedia file to the text transcription performed by the ASR process.

18. A method as per claim 17, comprising improving said selection of said language model by iteratively diarizing a transcription of a previous cycle of ASR processing with said textual information, if existing, aggregated thereto.

19. A method as per claim 1, wherein said multimedia information refers to news, the method comprising indexing said news from different sourcees.

* * * * *